J. MARSDEN.
CAR-STARTER.
No. 191,355.  Patented May 29, 1877.
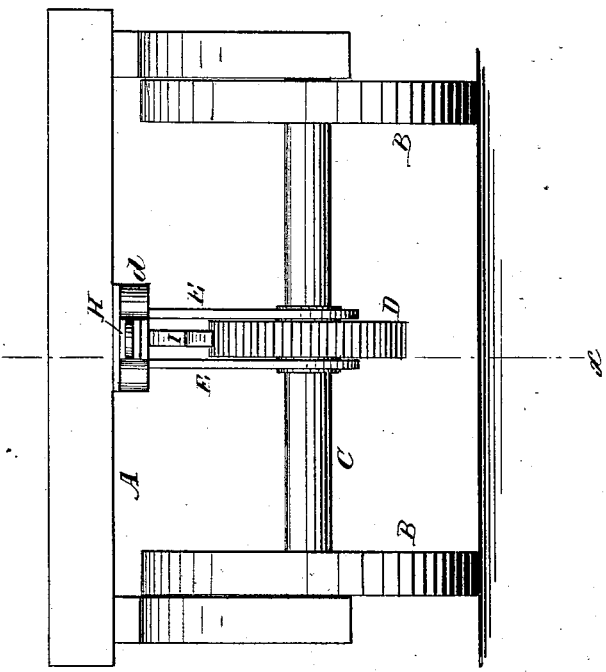
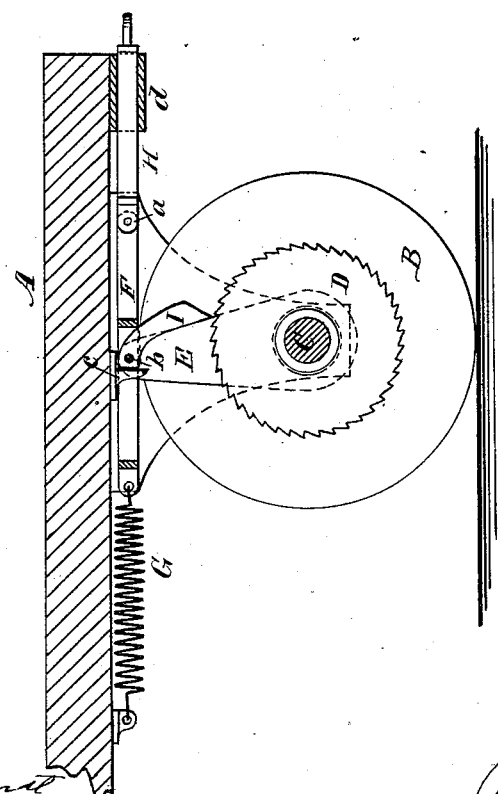
WITNESSES:  INVENTOR:

UNITED STATES PATENT OFFICE.

JOHN MARSDEN, OF CHESTER, PENNSYLVANIA.

IMPROVEMENT IN CAR-STARTERS.

Specification forming part of Letters Patent No. 191,355, dated May 29, 1877; application filed March 19, 1877.

*To all whom it may concern:*

Be it known that I, JOHN MARSDEN, of Chester, in the county of Delaware and State of Pennsylvania, have invented a new and Improved Car-Starter, of which the following is a specification:

Figure 1 is a longitudinal section, on line $x$ $x$ in Fig. 2, of a portion of a car having my improvement attached. Fig. 2 is an end elevation of a car, showing my improvements.

Similar letters of reference indicate corresponding parts.

The invention will first be described in connection with the drawing, and then pointed out in the claim.

In the drawing, A is the body of the car, which is supported upon wheels B secured to the axle C.

A ratchet-wheel, D, is keyed to the center of the shaft C, and upon its hub at each side of the wheel the levers E are placed, and are movable thereon.

F is a link, one end of which is connected with a spring, G, that is attached to the car-bottom or to some other fixed object, and the other end of the said link is jointed to the draw-bar H at $a$. The link F is placed between the upper ends of the levers E, and a pawl, I, is placed in the opening in the link. A pin, $b$, extends through the levers E, the link F, and the pawl I, all of which must move together.

The pawl is of sufficient length to engage the teeth of the ratchet-wheel D, and has formed upon it a shoulder that strikes a knee, $c$, that projects from the bottom of the car when the pawl is drawn back by the spring, together with the link and levers.

The draw-bar H moves through a guide, $d$, that is attached to the bottom of the car.

This invention is designed chiefly for horse-cars. The double-trees are hitched to the draw-bar H in the usual way, and when the car stops the draw-bar is drawn in by the action of the spring G, the link F, pawl I, and levers E moving back with it.

The shoulder of the pawl strikes the knee $c$ and throws it up out of the notches of the ratchet-wheel, so that the pawl will offer no impediment to the motion of the car in either direction.

When the horses start up the first outward motion of the draw-bar releases the pawl from the knee $c$, when it drops into a notch in the ratchet-wheel, and the further drawing of the horses results in starting the car by turning the axle and wheels B. This action continues until the head on the draw-bar formed by the joint $a$ strikes the guide $d$, when the further pulling of the horses draws the car ahead in the usual way.

By my improvement the power is applied in the most effective manner, and the most difficult part of the work in propelling street-cars is avoided.

Having thus described my invention, I claim as new and desire to secure by Letters Patent—

The combination, with the axle having ratchet-wheel thereon, of the loose levers E, the spring-link F, pivoted to the draw-bar and pawl I, the levers, link, and pawl being all pivoted and moving together on the pin $b$, as and for the purpose specified.

JOHN MARSDEN.

Witnesses:
H. L. DONALDSON,
JOHN G. WRIGHTSON.